United States Patent
Fujii et al.

(10) Patent No.: US 9,951,827 B2
(45) Date of Patent: Apr. 24, 2018

(54) METHOD TO IDENTIFY AUTOMATIC TRANSMISSION LUBRICATION OIL FLOW RATES CORRESPONDING TO A RUNNING VEHICLE WITHOUT DIRECT OIL FLOW MEASUREMENTS

(71) Applicant: FORD GLOBAL TECHNOLOGIES, LLC, Dearborn, MI (US)

(72) Inventors: Yuji Fujii, Ann Arbor, MI (US); Gregory Michael Pietron, Canton, MI (US); Rohit Hippalgaonkar, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 134 days.

(21) Appl. No.: 15/067,950

(22) Filed: Mar. 11, 2016

(65) Prior Publication Data

US 2017/0261047 A1 Sep. 14, 2017

(51) Int. Cl.
 *G01M 13/02* (2006.01)
 *F16D 25/12* (2006.01)
 (Continued)

(52) U.S. Cl.
 CPC ........... *F16D 25/123* (2013.01); *F16D 48/06* (2013.01); *F16H 57/0473* (2013.01); *F16D 2500/3067* (2013.01); *F16D 2500/506* (2013.01); *F16D 2500/50251* (2013.01); *F16D 2500/50287* (2013.01); *F16H 3/66* (2013.01); *F16H 45/02* (2013.01); *F16H 47/08* (2013.01); *F16H 57/0484* (2013.01); *F16H 2200/0052* (2013.01); *F16H 2200/201* (2013.01);
 (Continued)

(58) Field of Classification Search
 USPC ................ 73/115.01, 115.02, 115.03, 115.04
 See application file for complete search history.

(56) References Cited

U.S. PATENT DOCUMENTS 4,790,418 A 12/1988 Brown et al.
5,115,698 A 5/1992 Leising et al.
(Continued)

FOREIGN PATENT DOCUMENTS

EP 1712767 A1 10/2006
WO 2014164408 A1 10/2014

*Primary Examiner* — Eric S McCall
(74) *Attorney, Agent, or Firm* — David B. Kelley; Brooks Kushman P.C.

(57) ABSTRACT

A method of determining automatic transmission lubrication fluid flow rates corresponding to a running vehicle without direct oil flow measurements is disclosed. A set of in-vehicle clutch torques for a chosen clutch pack during a gear shift event for a set of shift conditions is obtained. A series of bench tests at various clutch-pack clearances and oil-flow rates for the set of shift conditions are performed. The clearances and oil-flow rates are adjusted in response to the measured magnitudes exceeding thresholds. In-vehicle transmission lubrication oil-flow rates are estimated at the chosen clutch pack for the set of shift conditions when the bench-test and in-vehicle clutch torques are less than the thresholds. The steps are reproduced for other engine conditions and fluid temperatures corresponding to other transmission gear positions. A functional map of in-vehicle oil flow rates are produced, and the transmission is adjusted based on the map.

9 Claims, 10 Drawing Sheets

(51) Int. Cl.
    *F16H 57/04*    (2010.01)
    *F16D 48/06*    (2006.01)
    *F16H 45/02*    (2006.01)
    *F16H 47/08*    (2006.01)
    *F16H 3/66*    (2006.01)

(52) U.S. Cl.
    CPC ............ *F16H 2200/2043* (2013.01); *F16H 2200/2066* (2013.01); *F16H 2200/2082* (2013.01); *F16H 2342/04* (2013.01)

(56) References Cited

U.S. PATENT DOCUMENTS

| | | |
|---|---|---|
| 6,259,986 B1 | 7/2001 | Kotwicki |
| 6,514,173 B2 | 2/2003 | Suzuki |
| 6,676,561 B2 | 1/2004 | Fritzer et al. |
| 6,770,010 B2 | 8/2004 | Matsumura et al. |
| 6,902,511 B2 | 6/2005 | Shimizu et al. |
| 6,923,049 B2 | 8/2005 | Fujii et al. |
| 7,212,935 B1 | 5/2007 | O'Brien et al. |
| 7,693,635 B2 | 4/2010 | Rains |
| 8,083,041 B2 | 12/2011 | Capito et al. |
| 8,155,850 B2 | 4/2012 | Greenwood-Smith |
| 8,255,130 B2 | 8/2012 | Fujii et al. |
| 8,308,608 B2 | 11/2012 | Wilke et al. |
| 8,510,003 B2 | 8/2013 | Yanakiev et al. |
| 8,843,289 B2 | 9/2014 | Postic et al. |
| 8,965,652 B2 | 2/2015 | Moorman et al. |
| 9,022,165 B2 | 5/2015 | Sah et al. |
| 9,074,645 B2 | 7/2015 | Hosokawa et al. |
| 2002/0137595 A1 | 9/2002 | Markyvech et al. |
| 2009/0105039 A1 | 4/2009 | Sah et al. |
| 2009/0118930 A1 | 5/2009 | Heap et al. |
| 2010/0318269 A1 | 12/2010 | Yanakiev et al. |
| 2012/0316738 A1 | 12/2012 | Teslak et al. |
| 2014/0324308 A1 | 10/2014 | Pietron et al. |
| 2016/0047714 A1* | 2/2016 | Fujii ............... F16H 61/061 73/115.04 |
| 2016/0195451 A1* | 7/2016 | Fujii ............... F16H 61/061 73/115.02 |

\* cited by examiner

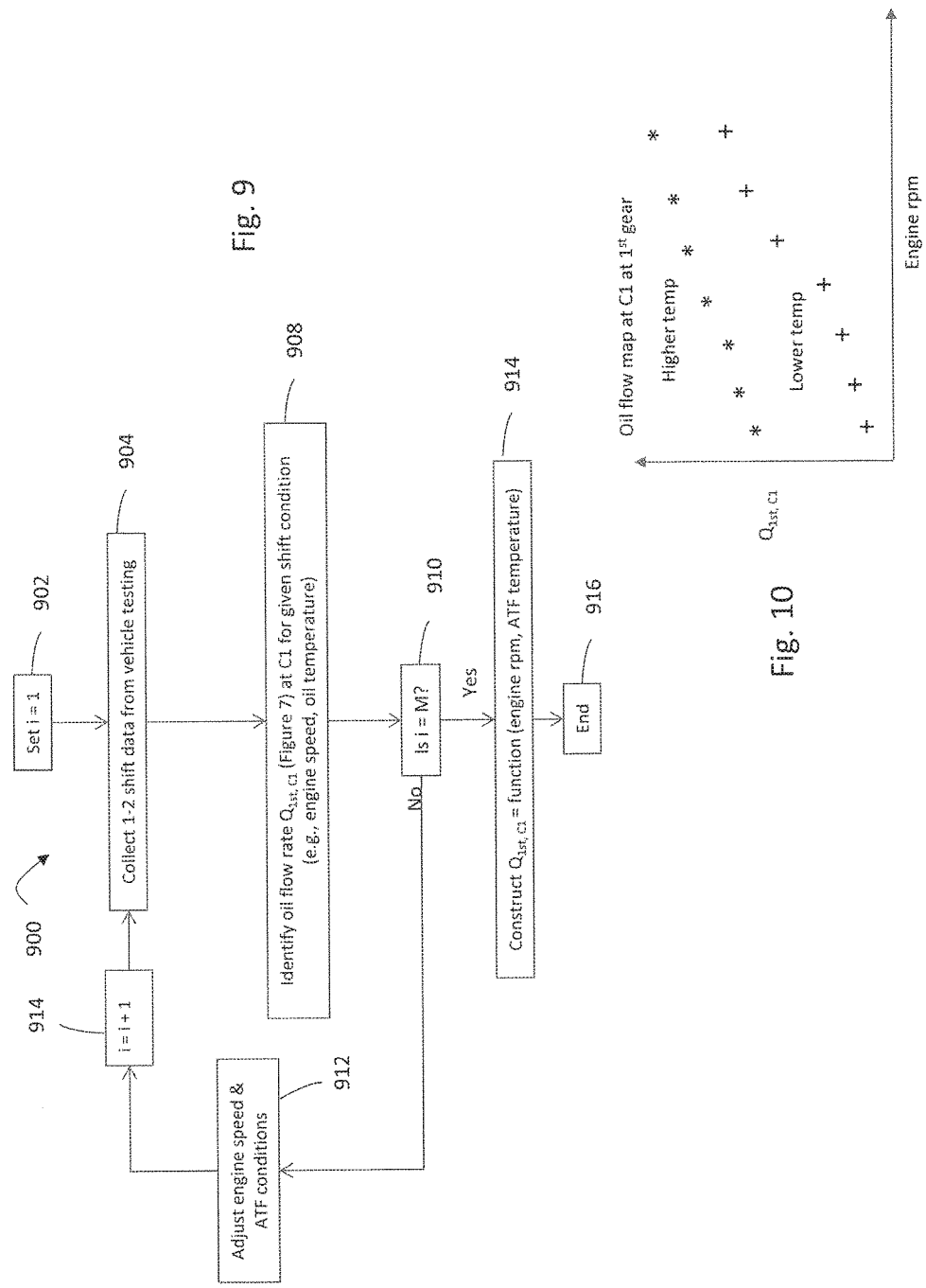

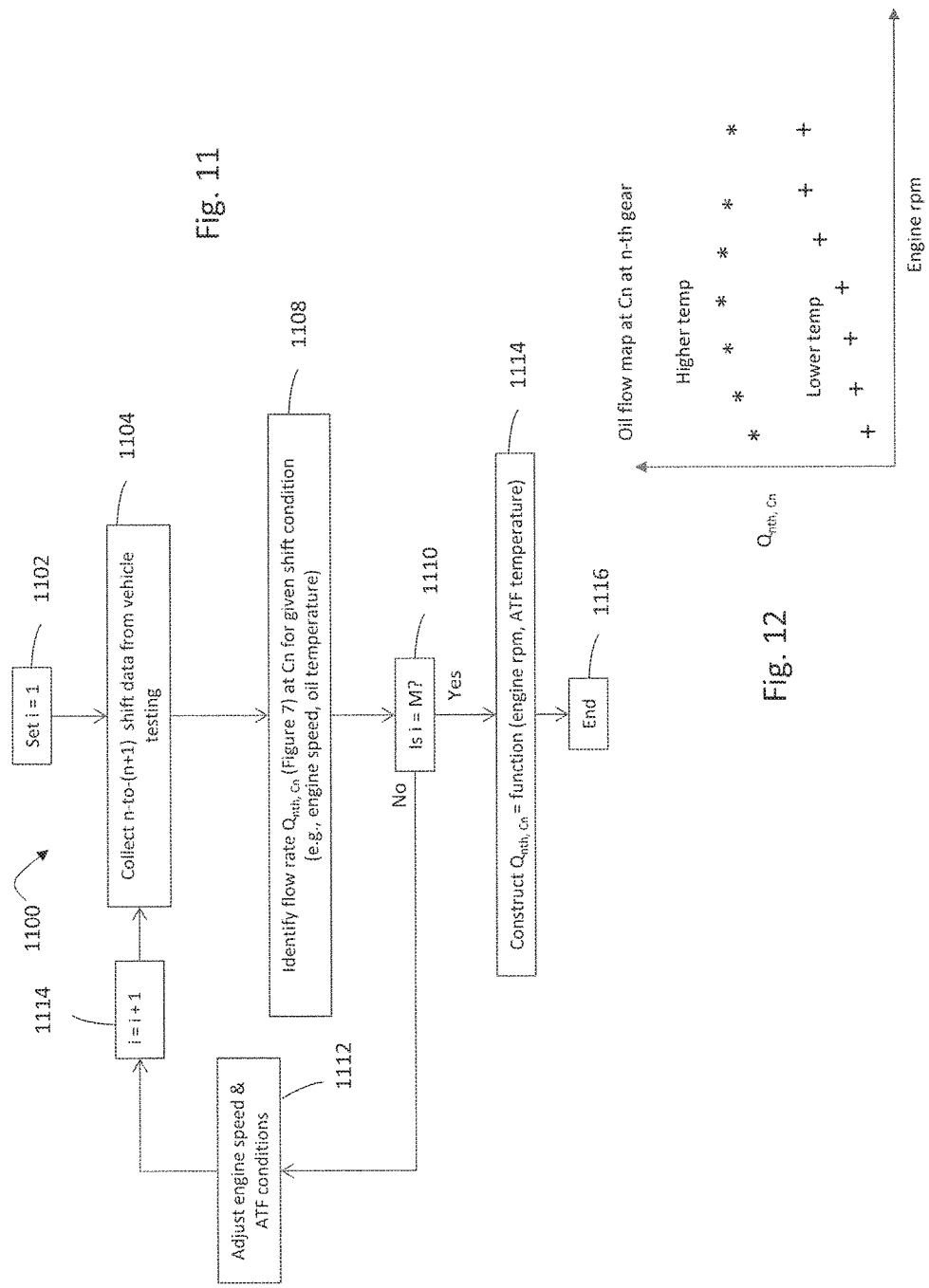

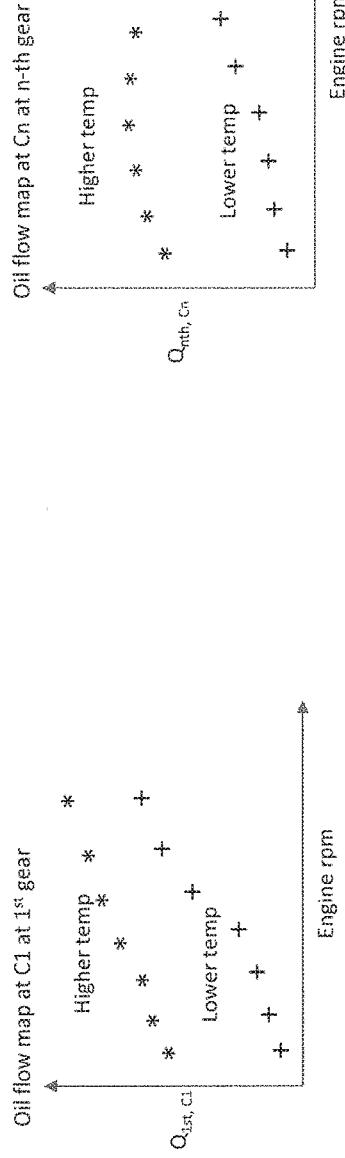
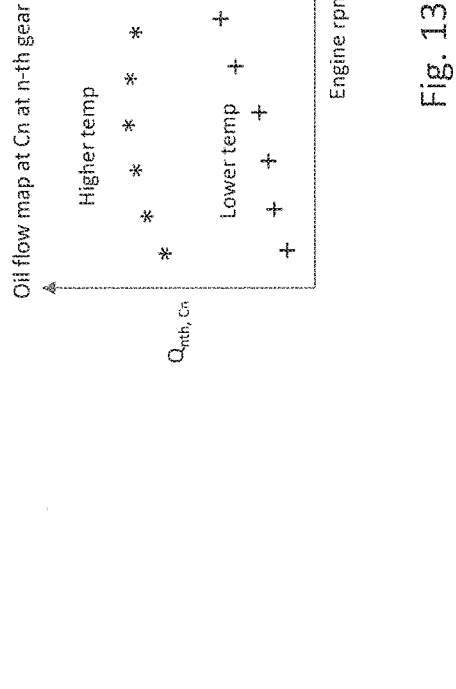
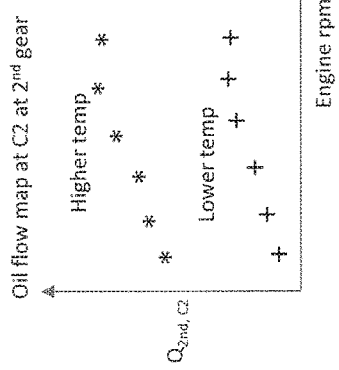
Fig. 13A
Fig. 13B
Fig. 13C

METHOD TO IDENTIFY AUTOMATIC TRANSMISSION LUBRICATION OIL FLOW RATES CORRESPONDING TO A RUNNING VEHICLE WITHOUT DIRECT OIL FLOW MEASUREMENTS

TECHNICAL FIELD

This invention relates generally to a bench test method for calibrating an oil-lubricated wet clutch for enabling an accurate replication of dynamic engagement torque behaviors during a transmission shift event in a vehicle. More particularly, the invention relates to systematically adjusting and identifying initial clutch clearance and lubrication conditions during bench testing.

BACKGROUND

Many vehicles are used over a wide range of drive conditions, including both forward and reverse movement. The powertrain systems, in particular internal-combustion engines, however, have desirable operating conditions, including engine speed range, where they run most efficiently. Consequently, automotive transmissions capable of efficiently transmitting power at a variety of speed ratios are frequently employed. Transmission speed ratio is the ratio of input shaft speed to output shaft speed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

A common type of automatic transmission includes a gearbox capable of alternately establishing a fixed number of power flow paths, each associated with a fixed speed ratio. The gearbox includes a number of shift elements such as wet clutches and brakes, where their frictional interfaces are continually lubricated with automatic transmission fluid. A particular power flow path is established by engaging a particular subset of the shift elements. To shift from one power flow path to another power flow path with a different speed ratio, one or more shift elements must be released while one or more other shift elements must be engaged. Some shift elements are passive devices such as one way clutches, while other shift elements engage or disengage in response to commands from a controller. For example, in many automatic transmissions, the shift devices are hydraulically controlled friction elements such as wet clutches or brakes. The controller regulates the torque capacity of the shift element by regulating an electrical current to a solenoid, which adjusts a force on a valve which, in turn, adjusts a pressure in a hydraulic circuit.

A modern automatic transmission is controlled by a microprocessor which adjusts the torque capacity of each wet shift element, including any lock-up clutch, at regular intervals. At each interval, the controller gathers information indicating the driver's intent, such as the positions of the shifter (PRNDL), the accelerator pedal, and the brake pedal. The controller also gathers information about the current operating state of the vehicle, such as speed, and of the engine. Increasingly, information is also available from other sources, such as anti-lock brake controllers and GPS systems. Using this information, the controller determines whether to maintain the currently established power flow path or to shift to a different power flow path. If the controller decides to shift to a different power flow path, the controller then adjusts the torque capacities of the off-going shift elements and the on-coming shift elements in a coordinated manner in order to make the transition as smooth as possible. However, it remains a challenge to accurately deliver desired clutch torque for both engagement and release processes. This is because the wet clutch hydrodynamically transmits torque by means of viscous shear across fluid film between rotating clutch plates with or without mechanical asperity contact at the frictional interfaces. This hydrodynamic torque is particularly sensitive to fluid conditions at the interface. Specifically, the amount of hydrodynamic torque is affected by the change rate of oil film thickness and slip speed during clutch engagement and exhibits highly non-linear behaviors with respect to actuator force profile and slip speed, making it difficult for the controller to consistently deliver desired torque under all shift conditions.

A wet clutch bench tester is widely utilized in order to improve clutch design features during a transmission development process. The industry-standard clutch test stand, which is often referred to as SAE No. 2 tester, is an inertia-absorption-type brake machine, typically equipped with a pneumatic actuator with limited control authority. It is utilized for evaluating clutch performance stability and durability during engagement duty cycles, but not capable of recreating realistic clutch slip and actuator force profiles for the purpose of shift control development. There are other clutch testers with advanced features such as enhanced electrical motor control and programmable hydraulic actuator, enabling the use of the methodology patented in U.S. Pat. No. 6,923,049 for accurately replicating clutch slip and actuator force profiles during torque phase and inertia phase of shifting as observed in a vehicle. However, clutch torque measurements obtained from such advanced testers do not correlate well with those observed in a vehicle, even if slip and force profiles are accurately replicated. There is a need to invent and establish a clutch bench test methodology that enables accurate replication of clutch engagement torque behaviors, as observed in a vehicle, to support transmission shift control development.

SUMMARY

According to one embodiment, a method of determining automatic transmission lubrication fluid flow rates corresponding to a running vehicle without direct oil flow measurements is provided. A set of in-vehicle clutch torques for a chosen clutch pack during a gear shift event for a set of shift conditions is obtained. A series of bench tests at various clutch-pack clearances and oil-flow rates for the set of shift conditions are performed. The clearances and oil-flow rates are adjusted in response to the measured magnitudes exceeding thresholds. In-vehicle transmission lubrication oil-flow rates are estimated at the chosen clutch pack for the set of shift conditions when the bench-test and in-vehicle clutch torques are less than the thresholds. The steps are reproduced for other engine conditions and fluid temperatures corresponding to other transmission gear positions. A functional map of in-vehicle oil flow rates are produced, and the transmission is adjusted based on the map. The designs and controls of the transmission are then adjusted based on the functional map of in-vehicle transmission lubrication oil flow rates for desired lubrication oil distributions within the transmission.

According to another embodiment, a method includes obtaining in-vehicle clutch torques (IVCTs) for a clutch pack during a gear shift event in a transmission, then performing bench tests at various lubrication oil-flow rates to obtain bench-test measured clutch torques (BTMCTs), then adjusting the oil-flow rates during the performing based on a difference between the BTMCTs and the IVCTs, and then constructing the transmission accounting for an estimated in-vehicle lubrication oil-flow rate that is based on the difference being less than a threshold.

BRIEF DESCRIPTION OF THE DRAWINGS

FIG. 9 is a flow chart of a method for generating and mapping oil flow at a first clutch C1 in first gear, according to one embodiment, according to one embodiment.

FIG. 10 is an example of an oil flow map at clutch C1 at first gear created from the test procedures accomplished according to the method of FIG. 9, according to one embodiment.

FIG. 11 is a flow chart of a method for generating and mapping oil flow at additional clutches Cn in a corresponding number n of different gears, according to one embodiment.

FIG. 12 is an example of an oil flow map at a clutch Cn at an n-th gear created from the test procedures accomplished according to the method of FIG. 11, according to one embodiment.

FIG. 13A illustrates an oil flow map at the first clutch C1 at first gear with two different oil temperatures as engine speed varies; FIG. 13B illustrates another oil flow map, but for a second clutch C2 at a second gear; FIG. 13C illustrates another oil flow map for another clutch Cn for an n-th gear.

DETAILED DESCRIPTION

Figure 1:
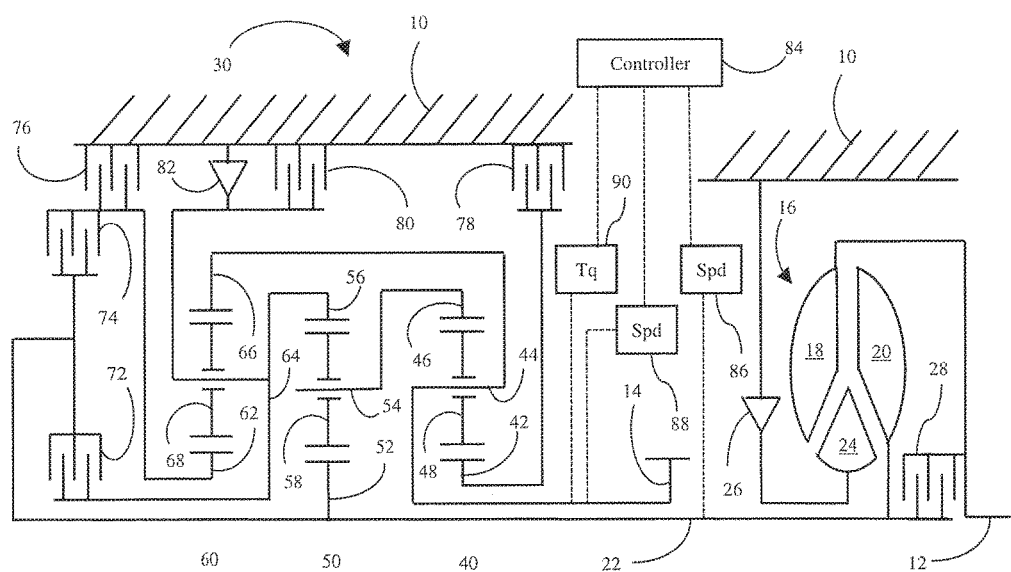
FIG. 1 is a schematic representation of a transmission, according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Controlling a hydraulically actuated automatic transmission requires manipulating a number of pressure commands to achieve a desired result. The desired result may be, for example, an upshift or downshift with particular torque and speed characteristics as a function of time. For an upshift, for example, the desired result may be a torque transfer phase that takes a specified amount of time, followed by a specified speed ratio vs. time profile during the inertia phase. In open loop control, the controller uses a model of the transmission to calculate what pressure commands will produce the desired result and then commands those pressure values. The model may be an empirical model based on testing a representative transmission or may be derived from physical laws and nominal transmission characteristics such as dimension. However, the actual behavior of the transmission may differ from the model for several reasons. First, there are part to part variations among transmissions of the same design. Second, a particular transmission varies over time due to gradual wear or unusual events. Third, the transmission responds to a large number of environmental factors such as temperature, atmospheric pressure, etc.

To improve control in the presence of these variations, called noise factors, a controller may utilize closed loop control. Closed loop control improves the result within a particular event, such as a shift. In closed loop control, the controller measures the property that defines the desired behavior, such as speed ratio. The difference between the measured value and a target value is called the error. The commanded pressure is set to the open loop term plus one or more closed loop terms that are functions of the error. Widely used examples of such function include linear terms such as: a proportional term (p term), a derivative term (d term), and an integral term (i term). Each such linear closed loop term has a coefficient of proportionality. These coefficients are set during calibration such that, despite the presence of noise factors, the result converges rapidly toward the desired behavior with minimal oscillation. Non-linear feedback terms may be employed in order to account for changing operating conditions, or to compensate for known non-linearities in the control system.

Adaptive control improves the result over a number of events. After an event, the controller utilizes the measurements made during the event to revise the model. (Sometimes this is done implicitly rather than explicitly, such as by modifying the open loop terms.) As the model becomes more representative of the particular transmission and the present conditions, the open loop control of future events becomes better. This minimizes the error that the closed loop terms need to accommodate. Moreover, it improves robustness of the phases of the shift that lack feedback information (e.g., the torque-transfer phase).

Both closed loop control and adaptive control require measurement or estimation of the properties that define the desired behavior. Ideally, this would be accomplished by having a separate sensor for each property. Unfortunately, sensors add cost and weight to a design and introduce failure modes. Also, some parameters are difficult to measure because the sensor would need to be buried in an inaccessible location of the transmission. Consequently, in practice, the number and type of sensors is restricted. When there is no sensor for the property that defines the desired behavior, a model may be utilized to estimate the value based on the available measured properties. These models are subject to the same types of noise factors as the models used to compute the open loop terms. Furthermore, a model may include assumptions that make it valid only under certain operating conditions, such as when in 2nd gear. In order to estimate the property in all of the relevant operating conditions, the controller may need to use multiple models. In some operating conditions, more than one of the models may be valid, leading to possibly conflicting estimates. In such cases, the controller must determine which estimate to trust. The controller may use the trusted model to revise the other models in order to improve the estimate in operating conditions in which the trusted model is unusable.

FIG. 1 illustrates a representative front wheel drive automatic transmission. The transmission is contained in a housing 10 that is fixed to vehicle structure. An input shaft 12 is driven by the vehicle engine. The input shaft may be connected to the engine via a damper that isolates the transmission from engine torque pulsations. An output element 14 drives vehicle wheels. The output element 14 may be driveably connected to the wheels via final drive gearing and a differential. The final drive gearing transmits the power to a parallel axis and multiplies the torque by a fixed final drive ratio. The final drive gearing may include layshaft gears, a chain and sprockets, and/or planetary gearing. The differential divides the power between left and right front wheels while permitting slight speed differences as the vehicle turns. Some vehicles may include a power take-off unit that transfers power to rear wheels.

A torque converter 16 has an impeller 18 fixed to input shaft 12 and a turbine 20 fixed to turbine shaft 22. Torque converter 16 transmits torque from input shaft 12 to turbine shaft 22 while permitting turbine shaft 22 to rotate slower than input shaft 12. When turbine shaft 22 rotates substantially slower than input shaft 12, a torque converter stator 24 is held against rotation by one way clutch 26 such that the torque applied to turbine shaft 22 is a multiple of the torque supplied at input shaft 12. When the speed of turbine shaft 22 approaches the speed of input shaft 12, one way clutch 26 overruns. Torque converter 16 also includes a lock-up clutch 28 that selectively couples input shaft 12 to turbine shaft 22.

Gear box 30 establishes a number of speed ratios between turbine shaft 22 and output element 14. Specifically, gear box 30 has three planetary gear sets and five shift elements that establish six forward and one reverse speed ratio. Simple planetary gear sets 40, 50, and 60 each have a sun gear (42, 52, 62), a carrier (44, 54, 64), and a ring gear (46, 56, 66) that rotate about a common axis. Each planetary gear set also includes a number of planet gears (48, 58, 68) that rotate with respect to the carrier and mesh with both the sun gear and the ring gear. Carrier 44 is fixedly coupled to ring gear 66 and output element 14, carrier 54 is fixedly coupled to ring gear 46, ring gear 46 is fixedly coupled to carrier 64, and sun gear 52 is fixedly coupled to turbine shaft 22.

The various speed ratios are established by engaging various combinations of shift elements. A shift element that selectively holds a gear element against rotation may be called a brake whereas a shift element that selectively couples two rotating elements to one another may be called a clutch. Clutches 72 and 74 selectively couple turbine shaft 22 to carrier 64 and sun gear 62, respectively. Brakes 76 and 78 selectively hold sun gear 62 and sun gear 42, respectively, against rotation. Brake 80 selectively holds carrier 64 against rotation. Finally, one way clutch 82 passively holds carrier 64 against rotation in one direction while allowing rotation in the opposite direction. Table 1 illustrates which shift elements are engaged to establish each speed ratio.

TABLE 1

|  | 72 | 74 | 76 | 78 | 80/82 | Ratio | Step |
|---|---|---|---|---|---|---|---|
| Reverse |  | X |  |  | X | −3.00 | 71% |
| 1st |  |  |  | X | X | 4.20 |  |
| 2nd |  |  | X | X |  | 2.70 | 1.56 |
| 3rd |  | X |  | X |  | 1.80 | 1.50 |
| 4th | X |  |  | X |  | 1.40 | 1.29 |
| 5th | X | X |  |  |  | 1.00 | 1.40 |
| 6th | X |  | X |  |  | 0.75 | 1.33 |

Shift element or wet friction elements 72-80 may be hydraulically actuated multi-plate wet friction clutches or brakes. Controller 84 controls the pressure of transmission fluid routed to each shift element actuator. This controller may adjust an electrical current to one or more variable force solenoids to control the pressure supplied to each clutch actuator piston. When pressurized fluid is first supplied to a shift element actuator, it moves a piston into a stroked position. Then, the piston forces plates together causing the shift element to transmit torque. Shift elements such as wet clutches and brakes are continually lubricated with transmission fluid at their frictional interfaces. Accordingly, the wet clutch hydrodynamically transmits drag torque between rotating plates even if actuator piston is retracted. However, the torque capacity is considered practically negligible for shift control purpose until the piston reaches the so-called touch point which is subject to unit-to-unit hardware variability, component wear and environmental conditions such as transmission fluid temperature. More precisely, as the piston is stroked, lubrication film at the frictional interface is squeezed out. When the film thickness becomes sufficiently small, the clutch can hydrodynamically transmit a significant amount of torque through viscous shear of rotating plates even before asperity contact takes place between rotating plates. This hydrodynamic torque is highly sensitive and non-linear with respect to the rate of film thickness change which is affected by actuator force profile and fluid conditions such as temperature, making it difficult to predict and control the touch point where the clutch starts transmitting usable torque for the purpose of shifting. Once oil film is sufficiently squeezed out, surface asperity contact takes place, enabling torque transfer through mechanical friction. As the engagement process continues, hydrodynamic torque diminishes and mechanical friction torque eventually constitutes the entire clutch torque. Replicating and predicting this complex dynamic engagement process on a clutch test stand, accurately capturing a fine balance of hydrodynamic torque and mechanical friction torque, is considered particularly difficult. When the pressure is relieved, a return spring moves the piston to a released (not stroked) position, freeing a torque path. The controller receives signals from transmission sensors such as a turbine speed sensor 86 and an output speed sensor 88. A typical upshift includes three phases: a preparatory phase, a torque transfer phase, and an inertia phase. During the preparatory phase, pressure is commanded to the on-coming shift element in order to stroke the piston so that it is ready for engagement. Also, the torque capacity of the off-going shift element may be reduced from a holding capacity well in excess of the transmitted torque to a value close to the actual transmitted torque. During the torque transfer phase, the torque capacity of the off-going shift element may be gradually reduced while the torque capacity of the on-coming shift element is gradually increased. During this phase, there is little or no slip across the off-going shift element but considerable slip across the on-coming shift element. When the off-going shift element torque capacity becomes sufficiently small, allowing it to slip, the power flow path associated with the upshifted gear is established through rising on-coming clutch engagement toque. Therefore, the torque ratio is equal to the upshifted torque ratio. However, the speed ratio is still equal or nearly equal to the original speed ratio. When the off-going shift element is completely released, the torque transfer phase ends and the inertia phase begins. During the inertia phase, the torque capacity of the on-coming shift element is controlled to eliminate the slip across the on-coming shift element and bring the speed ratio to the upshifted speed ratio in a controlled manner.

A power-on downshift also includes an inertia phase and a torque transfer phase, although they occur in the opposite order. During the inertia phase, the torque capacity of the off-going shift element is controlled to bring the speed ratio to the downshifted speed ratio in a controlled manner, which involves a progressively increasing slip across the off-going shift element. The on-coming shift element may be prepared for engagement by commanding pressure in order to stroke the piston. During the torque transfer phase, which occurs after the inertia phase, the torque capacity of the previously stroked on-coming shift element is gradually increased while the torque capacity of the off-going element is reduced to zero.

During the shift, accurate control of torque capacity is important in order to achieve a smooth shift. For example, during the torque transfer phase, the increase in torque capacity of the on-coming shift element must be carefully coordinated with the decrease in torque capacity of the off-going shift element. If the torque capacity of the on-coming shift element is ramped up too slowly, relative to the input torque and the rate of decrease of off-going shift element torque capacity, then an engine flare occurs. If, on the other hand, the on-coming shift element torque is ramped up too quickly, then a tie-up condition occurs. Both result in an excessive decrease in output torque.

Open loop control of shifts is aided by having a model for each shift element. The torque capacity of each clutch is adjusted by adjusting an electrical current to a solenoid in the hydraulic control system valve body. A valve in the valve body responds by adjusting the pressure in a fluid circuit in proportion to the force generated by the solenoid. The control fluid is routed to a clutch apply chamber where it pushes a piston to compress a clutch pack with interleaved friction plates and separator plates, squeezing out lubrication oil film at the clutch frictional interfaces, developing hydrodynamic torque before mechanical friction torque starts rising. A return spring forces the piston back when the pressure is relieved. In an exemplary steady state model of a hydraulically actuated friction clutch or brake, the torque capacity is a function of the electrical current supplied. This function generally has two segments. In a first segment, from zero current up to the current required to overcome the force of the return spring, the torque capacity is assumed to be practically zero. Beyond the current required to overcome the return spring, the torque capacity is assumed to increase linearly with respect to the current. However, the steady state model does not and cannot capture actual clutch behaviors, in particular at low temperatures where clutch torque is highly non-linear due to hydrodynamic torque and sensitive to time-dependent actuator force profiles. In an alternative model, the fluid pressure is a function of the electrical current and the torque capacity is a function of the fluid pressure. This alternative model may be useful if a pressure sensor is available to provide a pressure feedback signal. In some models, other factors such as temperature may be considered. The shift element model is represented by a transfer function $$T_{cl} = F(U, X)$$

where $T_{cl}$ is the predicted clutch torque, U is the command signal, such as current or pressure, and X is a set of parameters indicating the environmental conditions, such as temperature.

Figure 2:
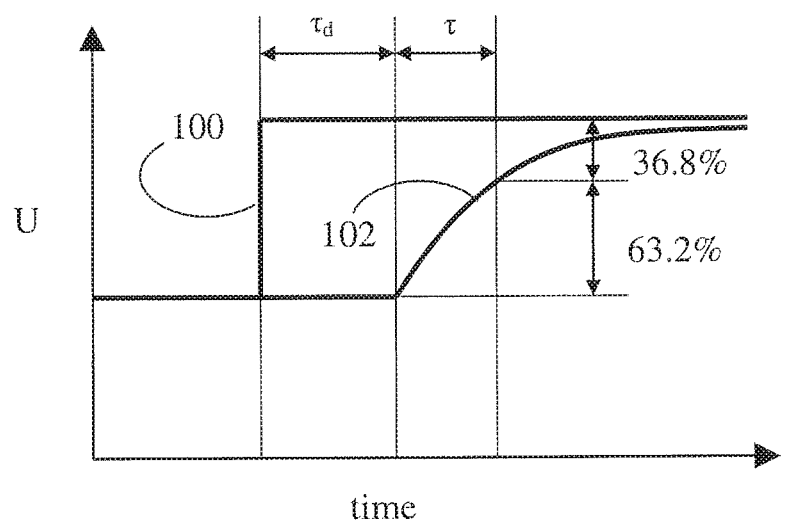
FIG. 2 is a graph illustrating the dynamic response of hydraulic pressure at the actuator piston to a shift element command signal, according to one embodiment.

In addition to consideration of the steady state relationship between clutch torque and a command signal, such as a pressure, the model may consider dynamic effects of hydraulic actuator system, accounting for pressurized fluid movement from the valve body to the clutch piston. FIG. 2 represents a possible model of the dynamic response of hydraulic pressure at the actuator piston with respect to a control signal. In this example, the commanded control signal 100 changes from one level to another level in a step function. The actual control signal 102 does not immediately change to the second level. Instead, the actual control signal remains at the original level for a period of time called the pure delay $\tau_d$. Then, the actual control signal asymptotically approaches the second according to a first order distributed delay with a time constant of $\tau$. After a delay of $\tau$, the actual signal has changed 63.2% of the way to the second value. This dynamic response model may be represented by the dynamic transfer function $$G(s) = e^{-\tau_d s} \frac{1}{\tau s + 1}$$

Figure 3:
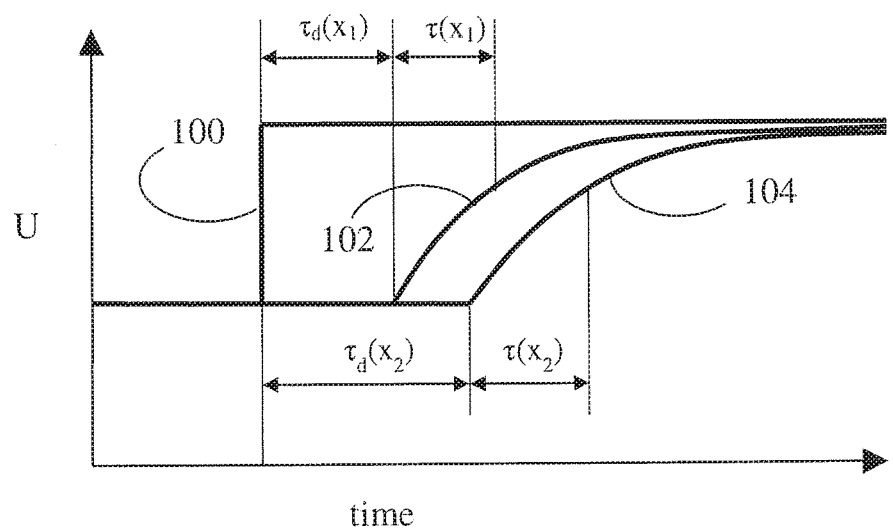
FIG. 3 is a graph illustrating how the dynamic response of hydraulic pressure at the actuator piston to a shift element command signal may vary based on environmental conditions, according to one embodiment.

As illustrated by FIG. 3, the dynamic response of hydraulic pressure at the actuator piston with respect to a commanded control signal may vary depending upon environmental conditions such as fluid temperature within the hydraulic actuator system. For example, curve 102 represents the dynamic behavior in one environmental condition $X_1$ while curve 104 represents the dynamic behavior in a second environmental condition $X_2$. For example, $X_1$ may correspond to normal operating temperature and $X_2$ may correspond to a colder temperature. The impact of environmental conditions may be modeled by expressing the model parameters $\tau_d$ and $\tau$ as functions of a set of environmental condition parameters X. The actuator models described in FIGS. 2 and 3 are intended for capturing dynamic behaviors of pressurized fluid in the hydraulic control system, which may be observed using pressure transducers instrumented in the valve body and clutch piston cylinder. However, they do not and cannot describe non-linear hydrodynamic behaviors of oil film that transmits hydrodynamic torque during clutch engagement process. Accordingly, even if the actuator dynamics is accounted through the actuator models as illustrated in FIG. 2 and FIG. 3, the model does not and cannot capture actual clutch behaviors, in particular at low temperatures where hydrodynamic clutch torque is highly non-linear and sensitive with respect to slip and actuator force profiles. There are no known dynamic clutch engagement models that can robustly determine clutch torques, accounting for both hydrodynamic torque and asperity contact torque, under all operating conditions, in particular between −40 C and +30 C.

Several of the models described above can be represented in controller 84 as one or more lookup tables. A lookup table stores predicted values of a model output variable for various combinations of values of one or more model input variables. When there is only one input variable, the lookup table is referred to as one dimensional. For example, a one dimensional lookup table may be used to represent the clutch transfer function model by storing values of clutch torque capacity at various commanded pressures. When the output variable is dependent upon multiple input variables, higher dimensional lookup tables are used. For example, a clutch transfer function may be represented as a two dimensional lookup table based on pressure and temperature.

To find a value for a model output variable based on particular values of the model input variables, the controller finds the stored points that are closest to the particular values and then interpolates. To find an input variable corresponding to a desired output variable, reverse interpolation is used. This reverse interpolation yields a unique solution only when the underlying function is monotonic. Alternatively, the model may be re-formulated such that clutch torque is an input variable and commanded pressure is an output variable. In practice, there are no known models that can accurately determine dynamic clutch engagement torques, accounting for both hydrodynamic torque and asperity contact torque, under all operating conditions in response to time-dependent slip and actuator force profiles. Thus, the reserve interpolation based on such models often fails to generate correct command pressures, resulting in poor shift quality.

Several methods are known for adaptively updating a model represented as a lookup function. These include both stochastic adaptation methods and periodic adaptation methods. Stochastic adaptation methods update the values in the lookup table in response to individual observed results. One such method is described in European Patent Application EP 1 712 767 A1, which is incorporated by reference herein. When the observed result differs from the value estimated by the lookup table, the stored values for nearby values of the model input variables are modified such that a new prediction for the same model input values is closer to the observed result. For stability, the adaptation is not allowed to change the stored values by too much at once. The adaptation may be restricted in various ways. For example, adaptation may only be allowed when the operating point is sufficiently close to one of the stored values. Also, there may be pre-defined bounds outside which adaptation is not performed. In a periodic adaptation method, multiple observations are stored and then a curve fitting process is performed to calculate new values for model parameters. As with stochastic adaptation methods, there may be restrictions on the rate of adaptation and there may be boundaries beyond which adaptation is not permitted. In practice, the effectiveness of adaptation strategies is limited to the inertia phase of shifting, where clutch torque behaviors are readily observable through component speed changes using commonly available sensors. There is a need for robust adaptation methods for capturing highly non-linear clutch torque behaviors during torque transfer phase of shifting, where clutch torque observability is limited.

In practice a transmission shift control calibration may be accomplished based on the combined use of steady-state clutch torque model, dynamic hydraulic actuator model, adaptive strategies as well as closed-loop controls, to manage and control clutch behaviors for shift conditions where clutch behaviors are observable. Open loop clutch controls may be utilized together with steady-state-clutch model and dynamic hydraulic actuator model for shift conditions where clutch torque is not observable. The models may be derived theoretically or empirically through clutch bench testing. However, the unavailability of accurate clutch torque models in particular at low temperature requires a transmission engineer to manually tune shift control parameters based on time-consuming trial- and error approaches in a vehicle. Thus, a methodology is desired to systematically capture and accurately represent dynamic clutch engagement behaviors over desired shift conditions and to construct a dynamic clutch transfer function which accurately describes a relationship between clutch torque and actuator force.

Figure 4:
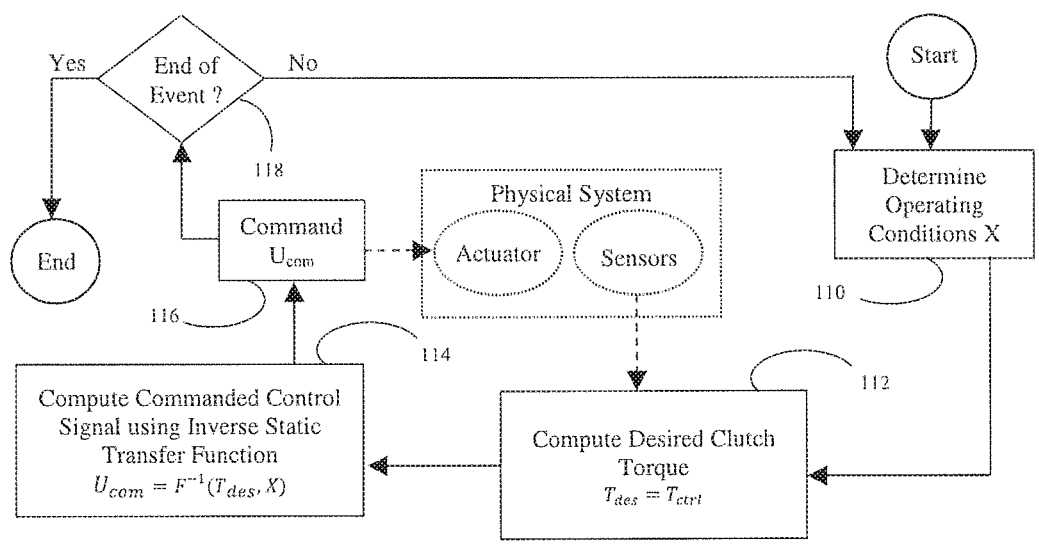
FIG. 4 is a flow chart for controlling a shift element, according to one embodiment.

FIG. 4 illustrates a clutch control algorithm that utilizes a static torque capacity model of the clutch system for control. Solid lines indicate flow of control. Dotted lines indicate flow of information. At 110, the controller determines the operating conditions X. At 112, the controller determines the desired clutch torque $T_{des}$ which is equal to a function $T_{ctrl}$. $T_{ctrl}$ may be based on indicators of driver intention such as accelerator pedal position, on estimates or measurements of transmission input torque, and on measurements from the transmission system, such as the speeds of various elements. For example, during the inertia phase on an upshift, the information from speed sensors may be used to determine how quickly the shift is progressing. If the shift is progressing more slowly than desired, $T_{ctrl}$ may be increased. At 114, the commanded control signal $U_{com}$ is computed using an inverse of the shift element transfer function which provides a relationship between commanded signal and clutch torque. At 116, the controller issues the computed control signal to the actuators. At 118, the controller determines if the shift event has completed and repeats the process if it has not. The performance of the shift control algorithm illustrated in FIG. 4 is limited by the static clutch transfer function which typically assumes a Coulomb friction model without accounting for hydrodynamic torque transfer mechanisms. The static transfer function may be based on clutch test data from SAE No2. Clutch test stand whose correlation with vehicle shift data is known to be less than satisfactory for most shift conditions. The performance of the shift control algorithm in FIG. 4 can be substantially improved if a dynamic clutch transfer function is made available, capable of predicting in-vehicle clutch behaviors under all shift conditions.

The algorithm of FIG. 4 can be improved by adapting the static transfer function using a measured clutch torque if such measurements are available. However, due to the dynamic response of the hydraulic clutch actuator system as illustrated in FIGS. 2 and 3, one would not expect the static transfer function alone, even if it is adapted with measured clutch torque, to accurately relate the present command control signal to the present measured torque when the control signal is changing. The clutch control algorithm of FIG. 5 utilizes the dynamic transfer function of the hydraulic clutch actuator to account for the dynamic response of the actuator system while adapting the clutch transfer function. At 120, the controller estimates the actual effective control signal, $U_{act}$, using the dynamic transfer function of the actuator and a recorded profile of past commanded control signals. At 122, the actual effective control signal is used with the static torque transfer function of the clutch to predict the present clutch torque $T_{cl}$. At 124, the controller estimates the present clutch torque based on measurements. Methods for doing this are described in U.S. Pat. No.

8,510,003 and U.S. patent application Ser. No. 14/668,062 now U.S. Pat. No. 9,709,164 which are hereby incorporated by reference herein. These two clutch torque estimates are compared at 126 to compute an error term. At 128, the static clutch transfer function is adapted to reduce the error. Since the clutch transfer function is adapted only a small amount during each iteration, random noise in the measurements does not cause substantial adaptation. This adapted clutch transfer function is used at step 114' to more accurately compute the control signal. Optionally, the desired clutch torque $T_{des}$ may include a function of the error at 112'.

Figure 5:
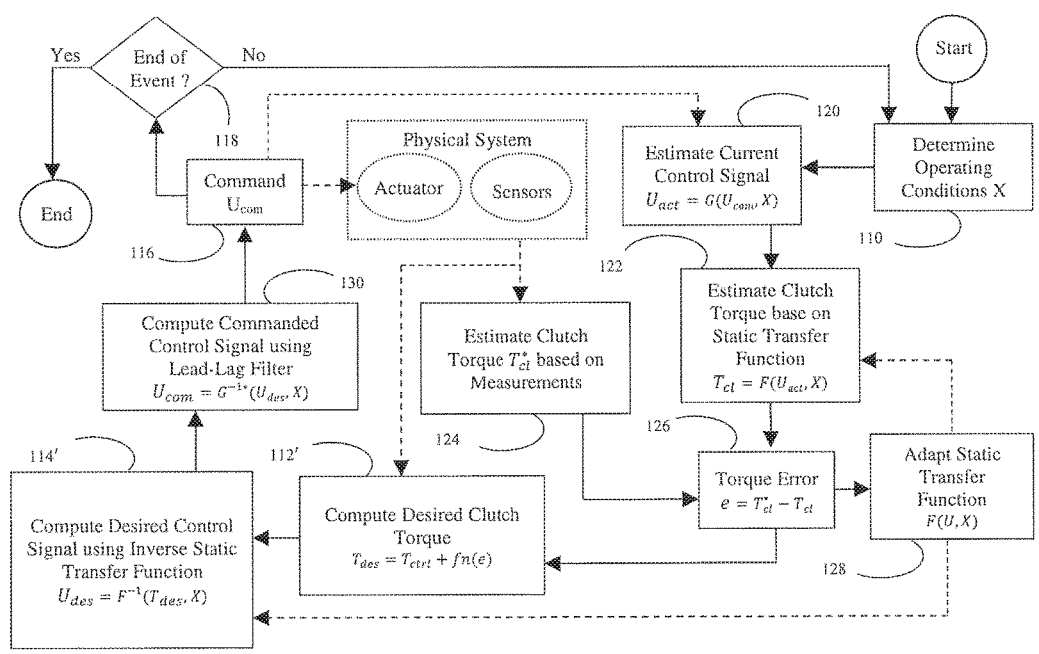
FIG. 5 is a flow chart for controlling a shift element and adapting a shift element transfer function while accounting for the dynamic response, according to one embodiment.

The algorithm of FIG. 5 also utilizes a dynamic model of the hydraulic clutch actuator to compute the commanded control signal $U_{com}$. Instead of computing $U_{com}$ directly from $T_{des}$ in a single step as 114 of FIG. 4, the calculation is divided into two steps 114' and 130. At 114' the controller computes the desired control signal $U_{des}$ using the static clutch transfer function. Then, at 130, the controller uses a lead-lag filter to at least partially compensate for the dynamics response of hydraulic actuator system. Ideally, the controller would use the inverse of the dynamic response function $G^{-1}( )$ of the hydraulic actuator system. However, the dynamic response function of the hydraulic actuator system may not be invertible without information about future values of $U_{des}$. Consequently, it may be necessary to use a lead-lag filter with a transfer function $$G^{-1*}(s) = \frac{\tau_1 s + 1}{\tau_2 s + 1}$$

that approximates $G^{-1}$. The lead time constant $\tau_1$ may be selected equal to the first order time constant $\tau$. Alternatively, to also partially compensate for the pure time delay, $\tau_1$ may be selected equal to the sum of the first order time constant and the pure delay $\tau + \tau_D$. The lag time constant $\tau_2$ is selected such that $\tau_2$ is much smaller than $\tau_1$ but still large enough to prevent excessive sensitivity to small variations in $U_{des}$.

Figure 6:
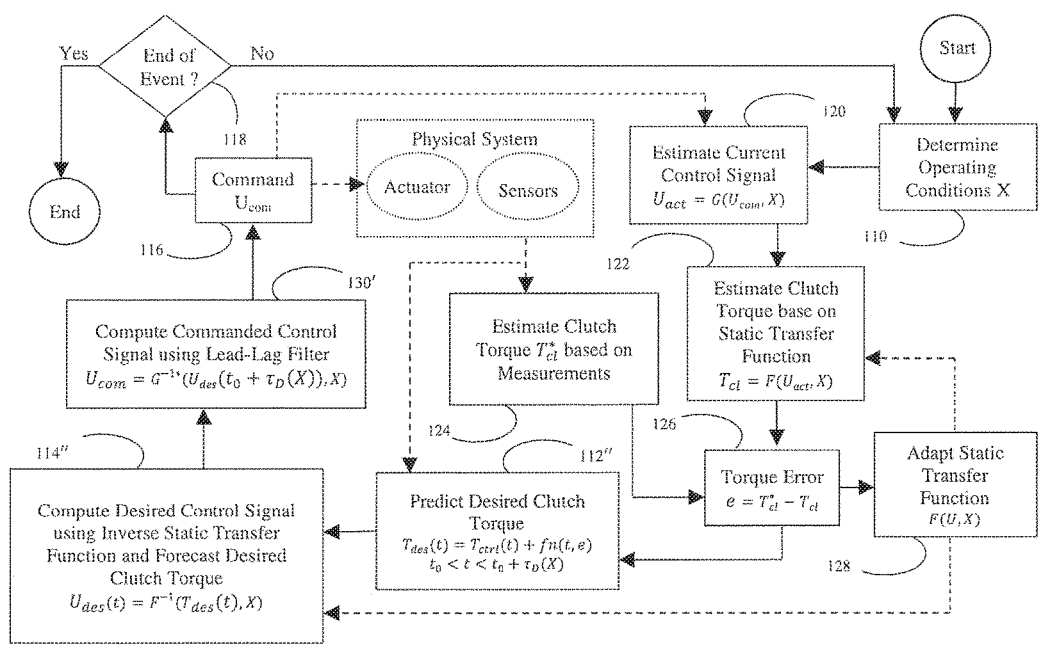
FIG. 6 is a flow chart for controlling a shift element and adapting a shift element transfer function when desired clutch torque can be forecast in advance, according to one embodiment.

FIG. 6 illustrates a further improvement upon the clutch control algorithm of FIG. 5. At 112", the controller predicts not only the present desired clutch torque, but predicts the desired clutch torque over a period of time extending into the future. This is possible because some of the terms used to compute the desired clutch torque are knowable or predictable in advance. For example, the nominal (feedforward) may be known if the desired ratio change is known for the next several update loops. Also, a feedback term based on an integral of the error may be predicted by assuming that the error continues at the present level. The controller may use the present value for other terms. Specifically, the desired clutch torque is predicted for a period of time at least as long as the pure time delay $\tau_d$. Then, at 114", the desired control signal is computed based on the static clutch torque transfer function and the predicted desired clutch torque for the same time period. At 130', the commanded control signal is computed by applying the lead-lag filter to the predicted desired control signal $\tau_d$ in the future. Consequently, the control signal has time to take effect by the time that clutch torque is actually desired despite the delays due to the hydraulic actuator system dynamics. The shift control algorithms illustrated in FIGS. 5 and 6 require accurate clutch torque measurements or estimates in real-time for the entire shift duration, including torque phase and inertia phase. In-vehicle clutch torque may be available only in a test vehicle which may be equipped with transmission torque sensor. Accurate measurements or estimates of in-vehicle clutch torque is not generally available in line-produced vehicles, making it difficult to directly employ the algorithms illustrated in FIGS. 5 and 6. In the absence of real-time clutch torque measurements in volume production vehicles, it become more important to develop a predictive dynamic clutch torque transfer function through bench tests to allow a shift controller to accurately determine clutch torque in response to control signals.

Step-ratio automatic transmissions require a complex sequence of wet clutch controls in order to shift between available gear positions. A conventional clutch control involves manual adjustments of shift calibration parameters, such as clutch actuator force profile for each shift, that are stored as a multi-dimensional look-up table in powertrain control strategies on a powertrain control module. Such approach is becoming increasingly undesirable because of a large number of shift combinations between gear positions.

An alternative approach is to utilize a functional representation of clutch behaviors, often referred to as clutch transfer functions (CTF), which may require less number of shift calibration parameters as compared to manual adjustments of actuator force profiles. CTF represents a relationship between clutch actuator force (or pressure) and torque transmitted through the clutch pack. CTF may take a different form such as a multi-variable lookup-table, polynomial function or neural net. A challenge is that there is no well-established methodology to analytically or experimentally generate CTF that accurately represents realistic in-vehicle clutch engagement characteristics during both torque transfer phase and inertia phase of shifting for a broad range of vehicle operating conditions.

A wet clutch pack is lubricated with transmission fluid at frictional interfaces. Torque transmission characteristics are highly sensitive to engagement conditions, specifically during torque transfer phase of shifting where hydrodynamic torque is significant. A transmission control may assume a linear and static relationship between torque and actuator force for CTF. However, this approach may not account for non-linear, dynamic nature of hydrodynamic clutch behaviors, which occur at specific phases of clutch engagement or disengagement, for example, during the torque phase at lower oil temperatures. A failure to utilize accurate CTF in clutch controls may result in undesirable transmission behaviors in a vehicle.

Several methods are known that enable calculation of dynamic (time-dependent) clutch torque during a shift event in a vehicle, based on measurements that are commonly available in test vehicles. Two such methods are disclosed in U.S. Pat. App. Pub. No. 2014/0324308 and U.S. application Ser. No. 14/668,190 now U.S. Pat. No. 9,726,280, which are both incorporated by reference herein. These methods may be utilized to identify CTF in a vehicle under dynamically-changing conditions. Such CTF may be referred to as dynamic clutch transfer functions (DCTF). However, it may be impractical to systematically cover the entire clutch operating conditions through vehicle testing. Also, it may be difficult to repeat clutch engagements under the same condition in a vehicle for repeatability verification because of uncontrolled factors such as transmission oil flow rate and temperature. U.S. Pat. No. 6,923,049, which is incorporated by reference herein, describes a clutch bench test methodology that enables accurate replication of torque phase and inertia phase conditions that are consistent with in-vehicle operations. Clutch torque behaviors obtained from bench testing, however, may still differ from actual in-vehicle clutch behaviors.

A methodology to replicate in-vehicle clutch behaviors through bench testing to enable an efficient and systematic generation of a DCTF under a broad range of clutch operating conditions is disclosed herein. As indicated above, U.S. Pat. No. 6,923,049 describes clutch bench test methodology that enables accurate replication of torque phase and inertia phase conditions that are consistent with in-vehicle operations. More specifically, U.S. Pat. No. 6,923,049 recreates dynamic profiles of clutch slip and the force of the clutch actuator that are observed during the torque phase and the inertia phase of shifting in an actual vehicle. The input torque to a clutch pack is controlled to achieve a target slip profile, while accounting for the effects of engine torque modulation that is commonly utilized during inertia phase of shifting. However, the clutch torque behaviors obtained from U.S. Pat. No. 6,923,049 may still differ from actual in-vehicle clutch behaviors. A method to calibrate clutch bench test conditions, based on the method from U.S. Pat. No. 6,923,049, to match in-vehicle clutch behaviors and a method to generate a DCTF over a broad range of operating conditions are disclosed herein.

The clutch pack clearance or clutch plate clearance is the accumulated travel distance of all the clutch plates during clutch engagement. Clutch torque behaviors from bench tests may differ from in-vehicle clutch behaviors due to limited knowledge or unavailability of clutch pack clearance or piston position at the beginning of torque transfer phase, which may be interchangeably referred to as the touch point, after piston stroking is initiated. At the touch point, the wet clutch starts to hydrodynamically generate torque before the piston is fully stroked. The touch point is highly sensitive to shift conditions because hydrodynamic torque depends on various factors such as fluid temperature, slip velocity, and oil film thickness. Clutch torque behaviors from bench tests may also differ from in-vehicle clutch behaviors due to limited knowledge or unavailability of the lubrication oil flow rate into the a hydraulically operated clutch pack during a shift event. A transmission oil temperature is typically measured at a transmission sump in a vehicle and can be utilized to specify oil temperature in clutch bench testing. It should be noted that the transmission oil is the same as the lubrication oil that operates the various clutches within a transmission. A thermo-couple may be inserted into the clutch plates of a clutch pack to measure fluid temperature at the interface between clutch plates in a test vehicle to define bench test conditions. However, there is no practical methodology to measure the amount of actual lubrication oil flow that travels through clutch pack during a shift event in a vehicle. Therefore, a nominal flow rate is typically prescribed in bench tests which may contribute to inaccurate test results. It may also be difficult to identify touch-point clutch pack clearance at the beginning of the torque phase when the clutch torque starts rising during shifting. The difference in clutch return spring mechanisms between bench test set up and in-vehicle clutch pack assembly introduces additional complexity to estimating the initial clutch pack clearance. Therefore, a nominal clutch pack clearance is typically prescribed in a bench test which may also contribute to inaccurate results. A systematic method to calibrate the initial clutch pack clearance and lubrication flow rate in clutch bench tests to match in-vehicle clutch behaviors during both torque phase and inertia phase of shifting is described herein.

Figure 7:
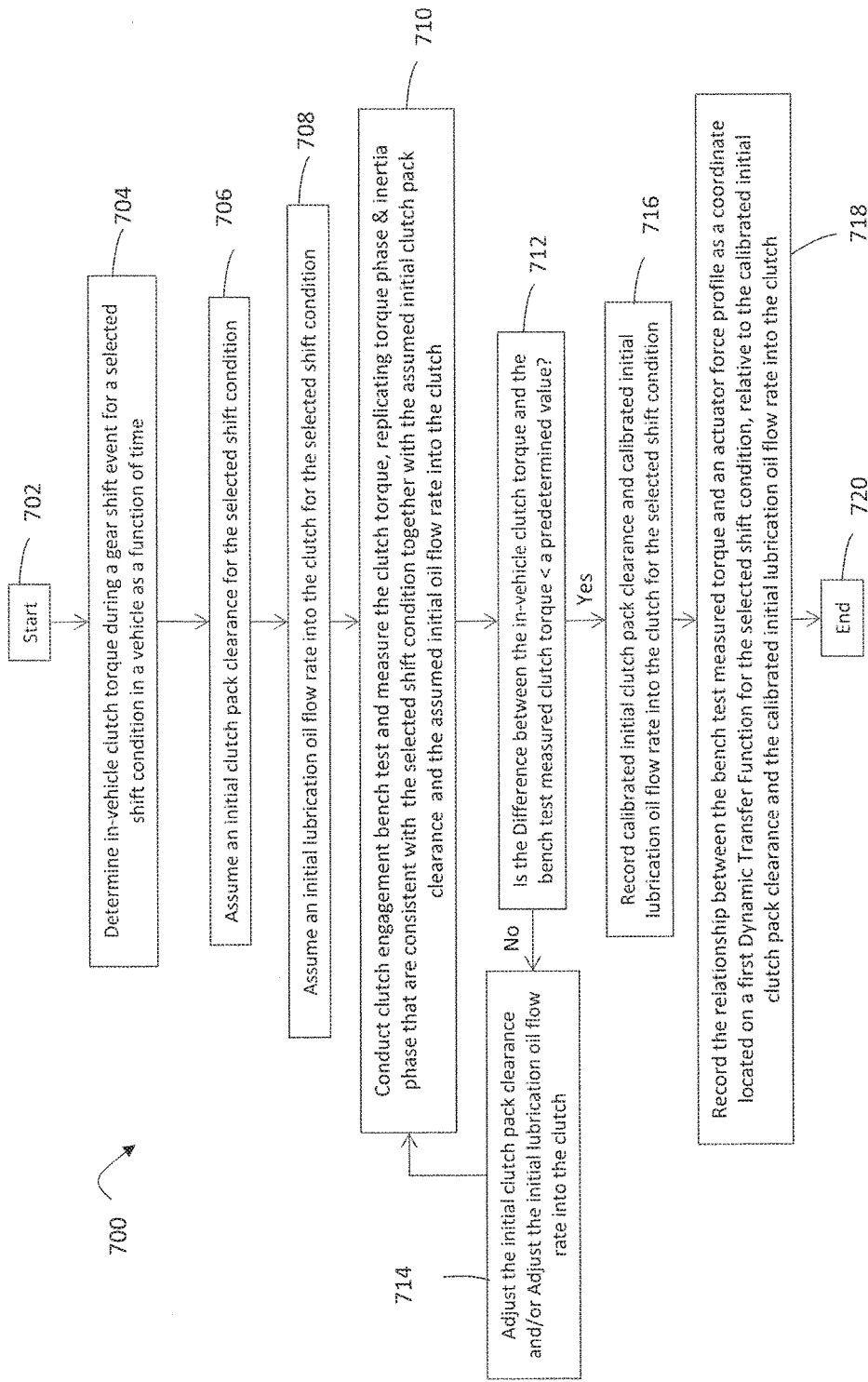
FIG. 7 is a flow chart of bench test procedure for calibrating a clutch pack clearance and an oil flow rate into a clutch based on a desired clutch torque profile for a vehicle shift condition, according to one embodiment.

Referring to FIG. 7, a flow chart of a method 700 for calibrating a clutch pack clearance and an oil flow rate into a clutch based a desired clutch torque profile for a vehicle shift condition is illustrated. The method is initiated at the start block 702. Next, the method moves on to step 704 where an in-vehicle clutch engagement torque as a function of time is determined during a shift event for selected shift condition $C_i$. At step 704, the in-vehicle clutch engagement torque may be measured or determined according to the methodology described in U.S. Pat. App. Pub. No. 2014/0324308 and/or U.S. application Ser. No. 14/668,190. The in-vehicle clutch engagement torque $T_v(t, C_i)$ for the selected shift condition $C_i$ is then recorded at step 704 as a function of time t and the shift conditions $C_i$ which include clutch operating variables such as the lubrication oil temperature and control variables such as the time-dependent actuator force profile and the slip profile of the clutch.

After step 704, the method moves on to step 706 where an initial clutch pack clearance $D(C_i)$ for the selected shift condition $C_i$ is assumed. Next, the method moves on to step 708 where an initial lubrication oil flow rate into the clutch $Q(C_i)$ for the selected shift condition $C_i$ is assumed. Once the initial clutch pack clearance $D(C_i)$ and the initial lubrication oil flow rate $Q(C_i)$ have been assumed, the method moves on to step 710.

At step 710, a clutch engagement bench test is conducted to determine a bench test measured clutch torque $T_b(t, C_i)$ as a function of time t. The bench test may be conducted according to the methodology described in U.S. Pat. No. 6,923,049, replicating torque phase and inertia phase conditions that are consistent with the selected shift condition $C_i$ (including the slip profile of the clutch, the actuator force profile, and the lubrication oil temperature) together with the assumed initial clutch pack clearance $D(C_i)$ and the assumed initial oil flow rate $Q(C_i)$. The touch-point clearance $D(Ci)$ may be adjusted by using shims inserted into the tested clutch pack and also re-positioning a clutch actuator piston.

After step 710, the method moves on to step 712, where the clutch torque profile from bench test, i.e., the bench test measured clutch torque $T_b(t, C_i)$ for the selected shift condition is compared to the in-vehicle torque profile $T_v(t, C_i)$, i.e., the in-vehicle clutch engagement torque for the selected shift condition $C_i$. If the difference between in-vehicle clutch engagement torque $T_v(t, C_i)$ and the bench test measured clutch torque $T_b(t, C_i)$ is not less than a predetermined value DT, the method moves on to step 714 where the initial clutch pack clearance $D(C_i)$ and the initial lubrication oil flow rate $Q(C_i)$ are systematically adjusted, unlike prior art clutch test methodologies where initial pack clearance and oil flow rate are neither recognized nor adjusted exclusively for the purpose of achieving a target torque profile obtained from the vehicle. The method then returns to step 710. The loop consisting of steps 710, 712, and 714 is repeated until the difference between in-vehicle clutch engagement torque $T_v(t, C_i)$ and the bench test measured clutch torque $T_b(t, C_i)$ is less than the predetermined value DT (i.e., the bench test measured clutch torque profile becomes within the pre-determined envelope of in-vehicle clutch torque profile).

It should be noted that alternatively at step 712 it may be determined whether the difference between in-vehicle clutch engagement torque $T_v(t, C_i)$ and the bench test measured clutch torque $T_b(t, C_i)$ is greater than a threshold. This alternative embodiment of step 712 would function in a similar manner as the embodiment described above, however the "no" and "yes" determination coming out of the box representing step 712 would be reversed.

Once the difference between in-vehicle clutch engagement torque $T_v(t, C_i)$ and the bench test measured clutch torque $T_b(t, C_i)$ for the selected shift condition is less than the predetermined value DT the method moves on to step 716, where an adjusted or calibrated initial clutch pack clearance $D(C_i)$ and an adjusted or calibrated initial lubrication oil flow rate $Q(C_i)$ are recorded. The adjusted or calibrated initial clutch pack clearance $D(C_i)$ and adjusted or calibrated initial lubrication oil flow rate $Q(C_i)$ are the values used during the bench test in step 710 that resulted in the difference between in-vehicle clutch engagement torque $T_v(t, C_i)$ and the bench test measured clutch torque $T_b(t, C_i)$ being less than the predetermined value DT.

Once the adjusted or calibrated initial clutch pack clearance $D(C_i)$ and the adjusted or calibrated initial lubrication oil flow rate $Q(C_i)$ are recorded, the method moves on to step 718. At step 718, the relationship between the bench test measured torque $T_b(t, C_i)$ and an actuator force profile $F(t, C_i)$, which is a function of time for the selected shift condition $C_i$, is recorded as a coordinate located on a first dynamic clutch transfer function $DCTF1(C_i)$ or simply a part of $DCTF(C_i)$ for the selected shift condition $C_i$, relative to the adjusted or calibrated initial clutch pack clearance $D(C_i)$ and the adjusted or calibrated initial lubrication oil flow rate $Q(C_i)$ into the clutch. The method then ends at step 720.

Figure 8:
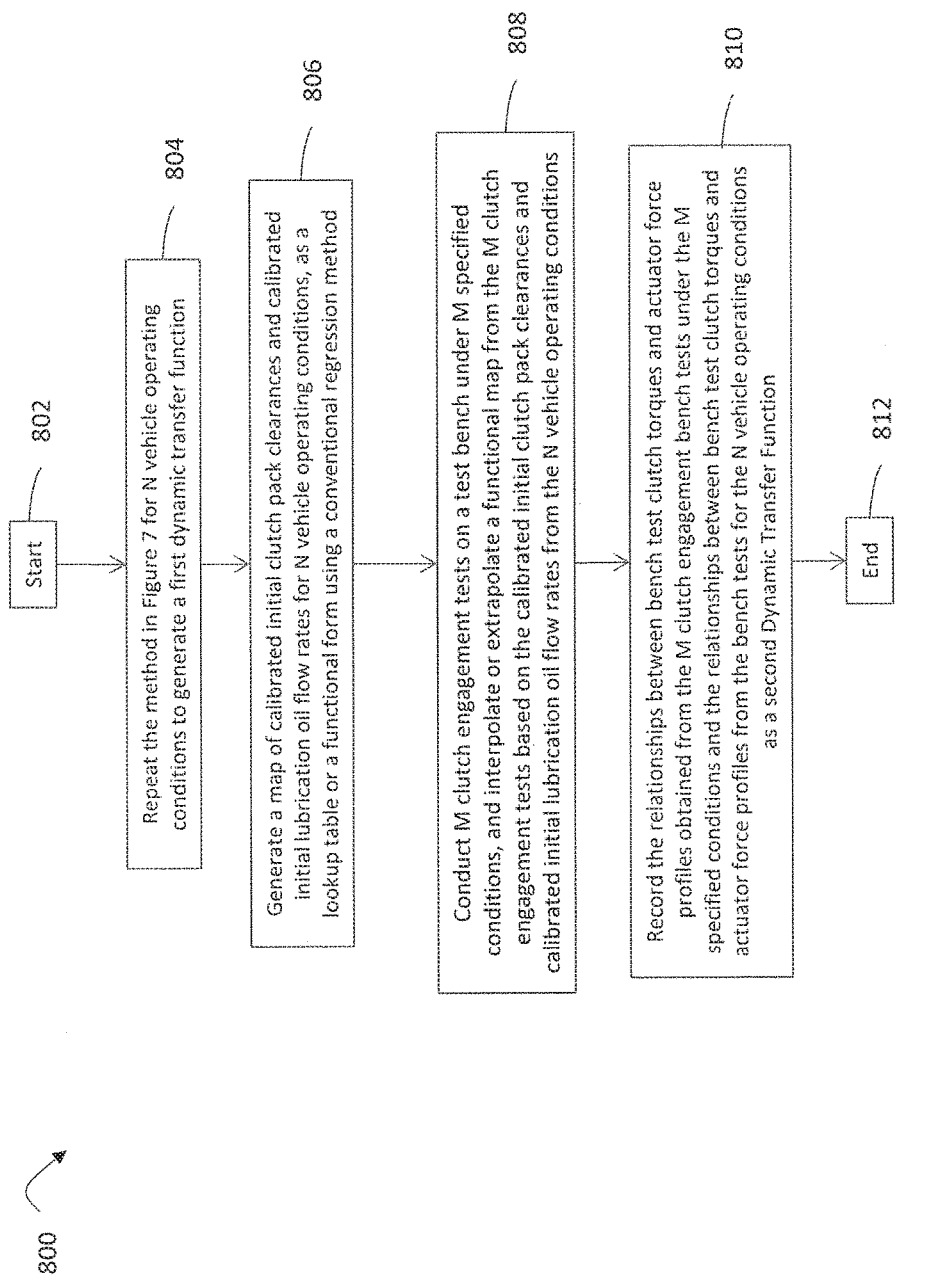
FIG. 8 is a flow chart of bench test procedure for generating a clutch element transfer function based on a set of calibrated clutch pack clearances and oil flow rates, according to one embodiment.

Referring to FIG. 8, a flow chart of a method 800 for generating a clutch element transfer function for additional shift conditions based on a set of initially calibrated clutch pack clearances $D(C_{i\ldots N})$ and a set of initial oil flow rates $Q(C_{i\ldots N})$ is illustrated. The method is initiated at the start block 802. Next, the method moves on to step 804 where the method described in FIG. 7 is repeated for N vehicle operating or selected shift conditions $C_i$, where, $i=1, 2, \ldots N$, to generate the first dynamic clutch transfer function DCTF1.

Next, the method moves on to step 806 where a map of calibrated initial clutch pack clearances $D(C_i)$ and oil flow rates $Q(C_i)$, with $i=1, \ldots N$, is generated. The map may be a lookup table or in a functional form using a conventional regression method. The generated map allows interpolation or extrapolation of initial clutch pack clearances D and oil flow rates Q over a broad range of operating conditions C, which are not limited to $C_i$, ($i=1, \ldots N$). Considering that a rotational speed of clutch plate and oil temperature have an impact on the lubrication oil flow rate, the initial clutch slip and oil temperature may be used as primary factors for a functional map of D(C) and Q(C), where D(C)=function (initial slip, oil temperature) and Q(C)=function(initial slip, oil temperature).

Once the functional map of calibrated initial clutch pack clearances D(C) and oil flow rates Q(C) is generated at step 806, the method moves on to step 808. At step 808, a set of M shift conditions $Ctf_k$, where $k=1, \ldots M$, are selected or constructed as desired without necessarily requiring any in-vehicle measurements and without specifically requiring in-vehicle clutch torque. M clutch engagement bench tests are conducted under the conditions $Ctf_k$, where $k=1, \ldots M$, for the desired torque phase and inertia phase conditions of a clutch, including various clutch slip profiles, actuator force profiles, lubrication oil temperature values. The bench test may be conducted according to the methodology described in U.S. Pat. No. 6,923,049, replicating both torque phase and inertia phase of shifting. At step 808 lubrication oil flow rates $Q(Ctf_k)$ and clutch pack clearances $D(Ctf_k)$ are specified for the bench test based on the functional representation of D(C) and Q(C) which are derived at 806.

After step 808, the method moves on to step 810, where the relationships between bench test measured torque profile $T_b(t, Ctf_k)$ and the actuator force profile $F(t, Ctf_k)$ are recorded from the M bench tests ($k=1, \ldots, M$) as the second dynamic clutch transfer function DCTF2. Then method then ends at step 812. Note that in-vehicle clutch torque is not required for shift conditions $Ctf_k$ ($k=1, \ldots, M$), whereas in-vehicle clutch torque is required for $C_i$ ($i=1, \ldots, N$). The methodology in the flow chart 800 enables the prediction of in-vehicle clutch torque $T_b(t, Ctf_k)$ for the conditions $Ctf_k$ through the use of the functional map of D and Q which are systematically derived based on in-vehicle clutch torque $T_v(t, C_i)$.

Referring to FIG. 9, a flow chart 900 of a method for generating and mapping oil flow at a first clutch C1 in first gear is illustrated. At step 902, a first value of i is set, $i=1$. At 904, shift data during gear shifting between first gear and second gear is collected from the test methods described above. At step 908, an oil flow rate $Q_{1st,C1}$ is identified at the clutch C1 for a given engine speed and oil temperature according to the method shown in FIG. 7 and described above. Because the method in FIG. 7 for identifying the lubrication fluid flow rate is largely affected by the torque phase of shifting, the resulting $Q_{1st,C1}$ represents the lubrication oil flow at C1 corresponding to the first gear condition before the engine speed changes to the second gear level. At step 910, the value of i is determined to see if it is equal to M, where M is a predetermined number. If i is not equal to M, then at 912 certain engine operating characteristics are changed, such as the engine speed, which changes the conditions of the automatic transmission fluid (ATF). In other words, engine speed and oil temperature can change. At step 914, the counter i is increased by one, and the steps at 904-910 are repeated for the new engine speed and transmission fluid characteristics. Steps 912, 914, 904, and 908 are sequentially repeated until it is determined at 910 that $i=M$. At that point, it can be interpolated that a sufficient amount of data is collected to construct a transfer function and create a map of the oil flow at clutch C1 for various engine speeds and oil flow rates. This is done at step 914. The method concludes for the first clutch C1 at step 916.

FIG. 10 illustrates an example of an oil flow map at clutch C1 at first gear created from the test procedures accomplished according to the flow chart 900. As can be seen in this embodiment, the oil flow rate at clutch C1 increases as engine speeds increases, for both a lower oil temperature and a higher oil temperature.

FIG. 11 is a flow chart 1100 of a method for generating and mapping oil flow at additional clutches Cn in a corresponding number n of different gears. Steps 1102, 1104, 1108, 1110, 1112, 1114, and 1116 mirror the test steps of FIG. 9, except that new tests are run for each of the different clutches Cn and each of the number n of gears. Like FIG. 10 for the first clutch C1, FIG. 12 illustrates an example of oil flow map at another clutch Cn at an n-th gear.

FIG. 13A illustrates an oil flow map at the first clutch C1 at first gear with a higher engine oil temperature and a lower oil temperature as engine speed is varied. The map is created based on the test methods described above. FIG. 13B shows a similar oil flow map, but for a second clutch C2 at a second gear. FIG. 13C shows another oil flow map for another clutch Cn for an n-th gear. Various maps can be created for a corresponding number of clutches and gears in the transmission.

The methods described above allow for identification of automatic transmission lubrication oil flow maps under actual drive conditions without having actual flow measurements during actual driving. This allows for accurate calibration of controls within the vehicle, as the characteristics oil can be estimated with a high degree of certainty based on the test data.

The maps and models described above, and the test methods for formulating the maps, can be tuned and adjusted for various vehicle specifications. For example, orifice sizes, tube lengths, and other system parameters can be varied for optimized data collection and analysis.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of determining automatic transmission lubrication fluid flow rates corresponding to a running vehicle without direct oil flow measurements, the method comprising:
    obtaining a set of in-vehicle clutch torques for a chosen clutch pack during a gear shift event for a set of shift conditions;
    performing a series of bench tests at various clutch pack clearances and lubrication oil flow rates for the set of shift conditions;
    adjusting a set of clutch pack clearances and lubrication oil flow rates during the series of bench tests in response to a difference between bench-test measured clutch torques and the corresponding in-vehicle clutch torques exceeding a threshold;
    estimating an in-vehicle transmission lubrication oil flow rate at the chosen clutch pack for the set of shift conditions in response to the difference between bench-test measured clutch torques and the corresponding in-vehicle clutch torques being less than the threshold;
    recording the estimated real in-vehicle transmission lubrication oil flow rate for a first engine condition and transmission oil temperature, corresponding to a given transmission gear position;
    reproducing the steps of measuring, performing, adjusting, estimating, and recording for other engine conditions and transmission fluid temperatures, corresponding to other given transmission gear positions;
    constructing a functional map of in-vehicle transmission lubrication oil flow rates at the clutch packs for the given transmission gear positions for the first and other engine conditions and transmission oil temperatures; and
    adjusting controls of the transmission based on the functional map of in-vehicle transmission lubrication oil flow rates for desired lubrication oil distributions within the transmission.

2. The method of claim 1, wherein the engine conditions include engine speed during the shift condition.

3. A method comprising:
    obtaining in-vehicle clutch torques (IVCTs) for a clutch pack during a gear shift event in a transmission;
    performing bench tests at various lubrication oil-flow rates to obtain bench-test measured clutch torques (BTMCTs);
    adjusting the oil-flow rates during the performing based on a difference between the BTMCTs and the IVCTs; and
    controlling the transmission accounting for an estimated in-vehicle lubrication oil-flow rate that is based on the difference being less than a threshold.

4. The method of claim 3, wherein the performing includes performing a series of bench tests at various clutch pack clearances and lubrication oil flow rates for a set of shift conditions.

5. The method of claim 3, wherein the adjusting includes adjusting a set of clutch pack clearances during the performing of bench tests in response to the difference between bench-test measured clutch torques and the corresponding in-vehicle clutch torques exceeding a threshold.

6. The method of claim 3, further comprising recording the estimated real in-vehicle lubrication oil-flow rate for a first engine condition and a first transmission oil temperature, corresponding to a given transmission gear position.

7. The method of claim 6, further comprising reproducing the steps of obtaining, performing, adjusting, and recording for other engine conditions and other transmission fluid temperatures, corresponding to other transmission gear positions.

8. The method of claim 7, further comprising constructing a functional map of in-vehicle transmission oil flow rates for the first and other transmission gear positions, the first and other engine conditions, and the first and other transmission oil temperatures.

9. The method of claim 8, further comprising adjusting controls of the transmission based on the functional map of in-vehicle transmission oil flow rates for desired lubrication oil distributions within the transmission.

* * * * *